United States Patent
Pereira Madeira et al.

(10) Patent No.: US 10,436,155 B2
(45) Date of Patent: Oct. 8, 2019

(54) AIR FILTER, FILTER ELEMENT AND FILTER HOUSING OF AN AIR FILTER

(71) Applicant: Mann+Hummel GMBH, Ludwigsburg (DE)

(72) Inventors: Pedro Miguel Pereira Madeira, Bietigheim-Bissingen (DE); Pascal Neef, Leonberg (DE); Nadine Sorger, Fellbach (DE); Irmgard Thalmann, Waiblingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 570 days.

(21) Appl. No.: 14/975,835

(22) Filed: Dec. 20, 2015

(65) Prior Publication Data

US 2016/0131094 A1  May 12, 2016

Related U.S. Application Data

(63) Continuation of application No. PCT/EP2013/071374, filed on Oct. 14, 2013, and a continuation-in-part of application No. 14/017,767, filed on Sep. 4, 2013, now Pat. No. 9,726,123.

(30) Foreign Application Priority Data

Jun. 20, 2013 (DE) ........................ 10 2013 010 218

(51) Int. Cl.
*F02M 35/024* (2006.01)
*B01D 46/00* (2006.01)
(Continued)

(52) U.S. Cl.
CPC ... *F02M 35/02425* (2013.01); *B01D 46/0005* (2013.01); *B01D 46/009* (2013.01);
(Continued)

(58) Field of Classification Search
None
See application file for complete search history.

(56) References Cited

U.S. PATENT DOCUMENTS

| 4,493,717 | A | | 1/1985 | Berger et al. |
| 5,755,844 | A | * | 5/1998 | Arai ........................ B01D 46/24 55/498 |

(Continued)

FOREIGN PATENT DOCUMENTS

| DE | 19960175 A1 | 9/2001 |
| DE | 102005025192 A1 | 12/2005 |

(Continued)

*Primary Examiner* — Amber R Orlando
*Assistant Examiner* — Brit E. Anbacht
(74) *Attorney, Agent, or Firm* — James Hasselbeck

(57) ABSTRACT

An air filter, including: an openable filter housing having an inlet for air to be cleaned, an outlet for cleaned air, a filter element exchangeably arranged with the filter housing. The filter element includes a filter medium radially surrounding and defining an interior space within the filter element and a support element secured to the filter element. The support element faces away from the filter medium and has a lateral support surface having a cylindrical section and/or a section with a cross section that changes in the direction of the element axis, whose main axis runs axially or parallel to the element axis and with which the support element is supported at least transversely to the element axis against a corresponding support section arranged on a side of the filter housing.

20 Claims, 8 Drawing Sheets

(51) Int. Cl.
*B01D 46/42* (2006.01)
*B01D 46/24* (2006.01)
*F02M 35/09* (2006.01)
*F02M 35/02* (2006.01)

(52) U.S. Cl.
CPC ...... *B01D 46/0041* (2013.01); *B01D 46/2411* (2013.01); *B01D 46/2414* (2013.01); *B01D 46/4254* (2013.01); *F02M 35/0203* (2013.01); *F02M 35/02433* (2013.01); *F02M 35/02483* (2013.01); *F02M 35/09* (2013.01); *B01D 2265/026* (2013.01); *B01D 2275/201* (2013.01); *B01D 2275/208* (2013.01); *F02M 35/0204* (2013.01); *F02M 35/02416* (2013.01)

(56) References Cited

U.S. PATENT DOCUMENTS

| | | | |
|---|---|---|---|
| 6,059,851 A | 5/2000 | DePietro et al. | |
| 6,385,810 B1* | 5/2002 | Lang | A47L 9/102 15/352 |
| 7,608,184 B2* | 10/2009 | Weindorf | B01D 35/153 210/234 |
| 7,662,203 B2 | 2/2010 | Scott et al. | |
| 8,038,756 B2* | 10/2011 | Iddings | B01D 46/009 55/502 |
| 8,142,533 B2* | 3/2012 | Gillenberg | B01D 46/0024 210/248 |
| 8,147,576 B2* | 4/2012 | Gillenberg | B01D 46/0046 210/248 |
| 8,920,530 B2* | 12/2014 | Ruhland | B01D 46/0024 210/450 |
| 9,067,161 B2* | 6/2015 | Campbell | B01D 46/2411 |
| 9,346,001 B2* | 5/2016 | Kato | B01D 46/0005 |
| 9,726,123 B2* | 8/2017 | Madeira | F02M 35/02483 |
| 9,889,398 B2* | 2/2018 | Campbell | B01D 46/0005 |
| 9,925,485 B2* | 3/2018 | Campbell | B01D 46/0005 |
| 2003/0121242 A1* | 7/2003 | Rieger | B01D 46/2414 55/493 |
| 2003/0217534 A1* | 11/2003 | Krisko | B01D 45/12 55/337 |
| 2006/0086075 A1* | 4/2006 | Scott | B01D 46/0001 55/498 |
| 2008/0190082 A1* | 8/2008 | Scott | B01D 46/0005 55/520 |
| 2008/0276583 A1* | 11/2008 | Munkel | B01D 46/0004 55/498 |
| 2013/0086877 A1 | 4/2013 | Kori et al. | |
| 2014/0298612 A1* | 10/2014 | Williams | A47L 9/10 15/347 |

FOREIGN PATENT DOCUMENTS

| | | |
|---|---|---|
| EP | 2138701 A2 | 12/2009 |
| GB | 1367701 A | 9/1974 |
| WO | 2009014982 A1 | 1/2009 |
| WO | 2009014986 A1 | 1/2009 |

* cited by examiner

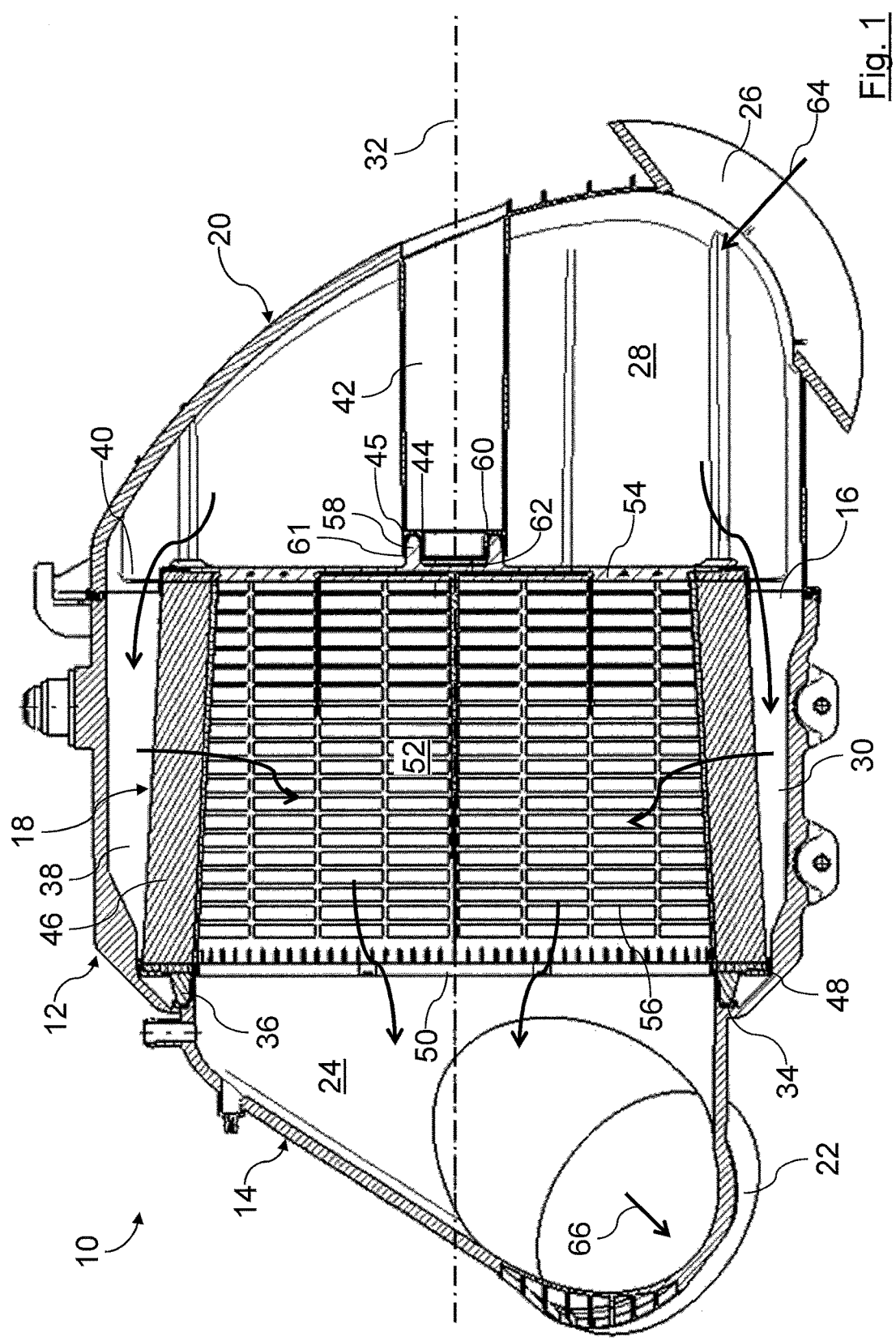

AIR FILTER, FILTER ELEMENT AND FILTER HOUSING OF AN AIR FILTER

TECHNICAL FIELD

The invention relates to an air filter, particularly of a combustion engine, particularly of a motor vehicle, particularly of a commercial vehicle, with an openable filter housing having at least one inlet for air to be cleaned and at least one outlet for cleaned air and in which a filter element is exchangeably arranged with a filter medium for filtering air such that it separates the at least one inlet from the at least one outlet.

The invention further relates to a filter element of an air filter, particularly of a combustion engine, particularly of a motor vehicle, particularly of a commercial vehicle, particularly of an air filter according to the invention, with a filter medium for filtering air.

Moreover, the invention relates to a filter housing of an air filter, particularly of a combustion engine, particularly of a motor vehicle, particularly of a commercial vehicle, particularly of an air filter according to the invention, that is openable and has the at least one inlet for air to be cleaned and at least one outlet for cleaned air and in which a filter element with a filter medium for filtering air can be exchangeably arranged such that it separates the at least one inlet from the at least one outlet.

BACKGROUND OF THE INVENTION

A commercially known air filter of an air intake system of a combustion engine of a motor vehicle has a filter housing composed of a housing pot and a housing lid. The housing lid can be removed from the housing pot in order to open the filter housing. The filter housing has an inlet for air to be cleaned and an outlet for cleaned air. A round filter element is arranged in the filter housing such that it separates the inlet from the outlet. The round filter element has a filter medium for filtering the air that surrounds an element interior space in relation to an element axis in a circumferentially closed manner. The filter element is arranged in an exchangeable manner in the filter housing.

SUMMARY OF THE INVENTION

It is the object of the invention to provide an air filter, a filter element and a filter housing of an air filter of the type mentioned at the outset in which the positioning and/or holding of the filter element in the filter housing can be improved, particularly simplified.

This object is achieved according to the invention by virtue of the fact that the filter element has at least one support element on an outer side facing away from the element interior space on at least one axial front side in relation to the element axis that has at least one lateral support surface that has at least one cylindrical section and/or a section with a cross section that changes in the direction of a main axis, its main axis running axial or parallel to the element axis, and with which the support element is supported at least transversely to the element axis against at least one corresponding support section on the side of the filter housing.

According to the invention, the at least one support element and thus the filter element is supported at least transversely to the element axis, particularly radially or tangentially to the element axis or radially to another axis that is parallel to the element axis. In this way, the filter element can be positioned and held in the radial direction in relation to the element axis. Due to the arrangement of the at least one support element on the outer side of the front side, the filter element can have an overall axial structure. As a result, it can be arranged in a space-saving manner in the filter housing.

When the filter element is properly installed, the element axis can advantageously run coaxially to a housing axis of the filter housing. In this way, the air filter can have an overall coaxial structure. The space requirement of the air filter can thus be further reduced. The element axis and/or the housing axis can advantageously run axially to a mounting direction of the filter element relative to the filter housing, particularly relative to a housing part with the at least one support section. In this way, the filter element can simply be inserted into the filter housing in the axial direction. In particular, the filter element can be inserted in the axial direction into a corresponding housing part, particularly a housing pot, of the filter housing. Advantageously, one of the housing parts, particularly the housing lid, can be inserted in the axial direction onto the filter element and the other housing part.

Advantageously, the at least one support element can be additionally supported in the axial direction in relation to the element axis in the filter housing. In this way, the axial position of the filter element can be preset. The filter element can advantageously be clamped and held in the axial direction between two opposing support sections of the filter housing.

The at least one lateral support surface can advantageously have a completely cylindrical shape. A cylindrical shape enables optimum load transmission from the at least one lateral support surface or to the at least one lateral support surface radially to a main axis of the at least one lateral support surface. Alternatively, the lateral support surface can have a cross section that changes along a main axis. The contour and/or dimensions of the cross-sectional surface can change. In particular, the at least one lateral support surface can have a completely conical shape. With a conical shape, the insertion of the at least one support section into the at least one lateral support surface and/or the insertion of the at least one lateral support surface into the at least one support section can be simplified. The at least one lateral support surface can also be composed of cylindrical sections and sections with changing cross sections, particularly conical sections.

The at least one lateral support surface can advantageously be straight-conical at least in sections and/or straight-conical. The at least one lateral support surface can also be obliquely cylindrical at least in sections and/or obliquely conical.

The at least one lateral support surface can advantageously delimit an oval, flatly oval or round cross section. It can also delimit a different type of cross section, particularly an angular cross section.

The at least one lateral support surface can be circumferentially closed. It can also have interruptions.

For example, the lateral support surface can be composed of lateral surfaces of several support elements, or the support element can have slots that constitute the interruptions of the lateral support surface. The at least one support element can also have more than one lateral support surface, preferably two lateral support surfaces. In this way, the support can be improved.

Advantageously, the at least one support element can have a hollow cylindrical or sleeve-like section. A radially inside lateral support surface can be implemented in relation to the main axis of the at least one support element by the radially inside circumferential side of the hollow cylindrical or sleeve-like section. Alternatively or in addition, a radially outside lateral support surface can be implemented by the radially outside circumferential side of the hollow cylindrical or sleeve-like section.

With a properly mounted filter element, the hollow cylindrical or sleeve-like section can advantageously be inserted into a corresponding front-side groove, particularly counter support groove, of the at least one support section. The groove can be regarded as a hollow space of the support section that is open toward the free front side of the support section. The radially inside lateral support surface of the at least one support element can be supported on a corresponding radially inside lateral counter support surface of the at least one support section. Alternatively or in addition, the radially outside lateral support surface of the at least one support element can be supported on a corresponding radially outside lateral counter support surface of the at least one support section.

Alternatively, the at least one support element can have a front-side groove, particularly a support groove, that extends circumferentially in relation to the main axis. The groove can advantageously be located in a front side of the at least one support element facing away from the filter element. The groove can be regarded as a hollow space of the at least one support element that is open toward its free front side. A radially inside lateral support surface can be embodied as the radially inside circumferential side of the groove in relation to the main axis of the at least one support element.

Alternatively or in addition, a radially outside lateral support surface can be embodied as the radially outside circumferential side of the groove in relation to the main axis of the at least one support element. A corresponding hollow cylindrical or sleeve-like section of the at least one support section can be inserted into the front-side groove of the at least one support element. The radially inside lateral support surface of the at least one support element can be supported on a corresponding radially inside lateral counter support surface of the at least one support section. Alternatively or in addition, the radially outside lateral support surface of the at least one support element can be supported on a corresponding radially outside lateral counter support surface of the at least one support section.

Advantageously, the filter housing can be composed of at least two housing parts. The two housing parts can advantageously be separated from one another completely or partially for the opening of the filter housing. One of the housing parts can particularly be a housing pot. The filter element can be accommodated in the housing pot. The housing pot can advantageously be coaxial to a housing axis. It can advantageously have an installation opening for the filter element that is coaxial to the housing axis. The filter element can thus easily be installed in the housing pot through the installation opening in the axial direction in relation to the housing axis. Another housing part can advantageously be a housing lid. The housing lid can be used to close the installation opening of the housing pot and thus the filter housing. The at least one inlet and the at least one outlet can be located in the same or in different housing parts.

The at least one support section can advantageously be located on one of the housing parts. Advantageously, the at least one support section can be located on the housing lid. As a result, the positioning of the filter element and/or the assembly of the at least one support element with the at least one support section can be simplified.

Advantageously, the filter element can be supported on the other housing part on the front side opposing the at least one support element.

Advantageously, the at least one support element and the at least one support section can have no sealing function. In this way, the supporting function can be respectively separated and optimized. A corresponding sealing function can be associated with at least one other component pair separated from the at least one support element and the at least one support section and thus be optimized separately. In another embodiment, the support element and the support section can have a sealing function. This is necessary, for example, if the support section has a continuous opening to the surroundings on the housing.

Advantageously, the at least one support element can be at least partially elastic. In this way, any installation tolerances of the filter element in the filter housing can easily be compensated for with the at least one support element. Furthermore, the at least one support element can additionally act as a vibration damper, particularly during operation of the air filter. Advantageously, the at least one support element can be made of an elastic plastic, particularly polyurethane (PUR). Polyurethane can easily be connected to the filter medium directly or indirectly by means of a suitable connecting body, particularly an end body or an end plate. The at least one support element can advantageously be foamed against or on the filter medium or the connecting body. The support element can also have a core made of a non-elastic plastic that is surrounded by elastic plastic, particularly enclosed in foam, whereby its stability is increased. Alternatively, the support element can also consist completely of a non-elastic plastic.

Advantageously, the filter element is embodied as a hollow element with a filter medium that encloses an element inner space in relation to the element axis. The support element is then located on an outer side of the front side of the filter element facing away from the element inner space. Advantageously, the element interior space can be closed on the front side of the filter element on which the at least one support element is located. In this way, air can be prevented there from flowing out of the element interior space or into the element interior space. In this way, it can be achieved that the air must flow through the filter medium. The air can pass through the filter medium from radially outside to radially inside into the element interior space or in the reverse direction therefrom. The air can flow through a corresponding flow-through opening on the other front side of the filter element into the element interior space or out of same.

In an alternative embodiment, the filter element can be constructed from alternatingly sealed channels. Such a filter medium is also known as flute medium. Elements constructed from such medium are also referred to as compact elements. Here, the inflow occurs axially from one front side to the other front side, the air entering on one front side into a channel that is open toward this front side and exiting on the opposing front side through another channel that is open at that front side. The filter element can advantageously be a hollow filter element, particularly a round filter element with a round cross section, an oval round filter element with an oval cross section, a flatly oval round filter element with a flattened oval cross section, a conical round filter element in which the round cross section tapers in the axial direction to the main axis, a conical oval round filter element in which the oval cross section tapers in the axial direction at least in the direction of a transverse axis, a conical flatly oval round filter element in which the flatly oval cross section tapers in the axial direction at least in the direction of a transverse axis, or a hollow filter element with a different, particularly an angular, cross section and/or a different axial cross sectional profile in the direction of the main axis.

The filter medium can advantageously be circumferentially closed, particularly folded in a star shape, particularly in a zigzag or wave shape. The filter medium can also be circumferentially closed in a non-folded manner.

The filter medium can be a filter paper, filter fleece or a different filter medium that is suitable for filtering air. The filter medium can be single- or multilayered.

The filter element can advantageously have a support body, particularly a support pipe. The support body can advantageously be located in the element interior space. A support body can also be provided that surrounds the filter medium radially on the outside. A circumferential wall of the support body can advantageously be air-permeable. The circumferential wall can advantageously be skeleton-like or lattice-like. The support body can advantageously be made of plastic. The filter medium can advantageously be supported against the support body. The support body can advantageously have at least one stiffening rib that extends on the interior of the support body in the axial direction. Through such a stiffening rib, undesired compression or denting of the filter element can be prevented. In a filter element with an oval cross section, for example, the stiffening rib extends along the small semiaxis. Advantageously, additional stiffening ribs can be provided that run parallel to this.

The air filter can advantageously be part of an air intake system of a combustion engine. It can be used to clean combustion air that is fed to the combustion engine. However, the invention is not limited to an air filter of an air intake system of a combustion engine of a motor vehicle, particularly of a freight vehicle. Rather, it can also be used in different air systems of motor vehicles. Advantageously, the air filter can also be a cabin filter. The air filter can also be used outside of automotive engineering, particularly in industrial engines. Advantageously, the air filter can be part of the air intake system of a commercial vehicle, particularly of a freight vehicle, a bus, a construction machine or an agricultural machine. The air intake system can advantageously be located on a vertical was, particularly a rear side, of a driver's cab of a commercial vehicle.

In an advantageous embodiment, the at least one support section can have at least one lateral counter support surface that can have at least one cylindrical section and/or at least one section with a cross section that changes in the direction of a main axis, particularly a conical section, and whose main axis can run axial or parallel to a housing axis, which can be coaxial to the element axis when the filter element is installed. In this way, the at least one lateral counter support surface and the at least one lateral support surface can have the same orientation when the filter element is installed.

Advantageously, the main axes of the at least one lateral support surface and the at least one lateral counter support surface run coaxially when the filter element is mounted. In this way, the at least one lateral counter support surface can easily be plugged onto or inserted into the at least one lateral support surface. Advantageously, the main axes of the at least one lateral support surface and the at least one lateral counter support surface run parallel to the mounting direction of the filter element relative to the filter housing, particularly to the housing part with the at least one support section, when the filter element is installed. In this way, the at least one lateral support surface and the at least one lateral counter support surface can easily be lined up automatically during the mounting of the filter element in the filter housing, particularly during the assembly of the filter housing. Advantageously, it is thus easily possible to line up the at least one lateral support surface with the at least one lateral counter support surface during the fitting of a housing lid on a housing pot.

Advantageously, the at least one lateral counter support surface can be complementary to the at least one lateral support surface at least in sections. The at least one lateral support surface can thus rest against the at least one lateral counter support surface in a near backlash-free manner. In this way, reliable and stable support can be provided transverse, particularly radial or tangential, to the element axis.

Advantageously, the at least one lateral counter support surface can be straight cylindrical and/or straight conical. The at least one lateral counter support surface can also be obliquely cylindrical and/or obliquely conical.

The at least one lateral counter support surface can advantageously delimit an oval, flatly oval or round cross section. It can also delimit a different type of cross section, particularly an angular cross section.

The at least one lateral counter support surface can be circumferentially closed. It can also have interruptions.

The at least one support section can also have more than one lateral counter support surface, preferably two lateral counter support surfaces.

Advantageously, the at least one support section can have a front-side groove, particularly a counter support groove, that extends circumferentially in relation to the main axis. The groove can advantageously be located on a front side of the at least one support section facing toward the filter element. A radially inside lateral counter support surface can be embodied as the radially inside circumferential side of the groove in relation to the main axis of the at least one support section. Alternatively or in addition, the radially outside lateral counter support surface can be embodied as the radially outside circumferential side of the groove.

Alternatively, the at least one support section can advantageously have a hollow cylindrical or sleeve-like section. A radially inside lateral counter support surface can be embodied by the radially inside circumferential side of the hollow cylindrical or sleeve-like section in relation to the main axis of the at least one support section. Alternatively or in addition, a radially outside lateral counter support surface can be embodied by the radially outside circumferential side of the hollow cylindrical or sleeve-like section.

In another advantageous embodiment, at least one lateral support surface can be oriented radially inward in relation to its main axis and surround a hollow space of the at least one support element that can be open on the corresponding free end of the at least one support element, at least one lateral counter support surface can be oriented radially outward in relation to its main axis and, when the filter element is installed properly, the lateral counter support surface can be inserted into the hollow space of the at least one support element.

Advantageously, the at least one support section can be or comprise a kind of arch or dome or be part of same. The at least one lateral counter support surface can be located at the free end of the arch or dome. The arch or dome can be connected with the other end to the filter housing, particularly the housing lid. It can particularly be integrally connected to the filter housing.

The arch or dome can advantageously extend through a space section of the filter housing. In this way, the filter element can be supported at a distance to a corresponding housing wall of the filter housing bridged over by the arch or dome. Advantageously, air can flow through the space section during operation of the air filter. Depending on the direction of flow of the air in the filter housing, the space section can be an inlet space section or an outlet space section.

Alternatively, the at least one or an additional lateral counter support surface can advantageously be oriented radially inward in relation to its main axis. The lateral counter support surface can surround a hollow space of the at least one support section that is open at the corresponding free end of the at least one support section. The at least one or an additional lateral support surface can be oriented radially outward in relation to its main axis. If the filter element is installed properly, the at least one lateral support surface can be inserted into the hollow space of the at least one support section.

In another advantageous embodiment, a support element can be arranged centrally in relation to the element axis on one of the front sides of the filter element. The filter element can thus be supported centrally. In this way, it is also possible to provide uniform support for the filter element on the filter housing with only one support element and only one corresponding support section. Support can thus be achieved with a low space requirement of the components required for this purpose in the filter housing.

Advantageously, several different support elements on the filter element can additionally be provided with corresponding support sections on the housing. Advantageously, the additional support elements can be arranged circumferentially in relation to the element axis on the front side on which the at least one support element is located. The additional support elements can advantageously be arranged in an edge region of the front side. Advantageously, the additional support elements can support the filter element in relation to the element axis in the radial direction against the corresponding additional support sections of the filter housing.

The additional support elements can advantageously be bars. The additional support elements can advantageously be elastic. They can thus also contribute to a tolerance equilibration and/or to vibration damping.

In another advantageous embodiment, a support section can be arranged centrally in relation to a housing axis that coincides with the element axis when the filter element is installed. This support section can easily cooperate with the corresponding centrally arranged support element.

In another advantageous embodiment, several support elements can be arranged on one of the front sides of the filter element. In this way, the support can be further improved. Tilting of the filter element in relation to the element axis can thus be prevented.

Advantageously, two support elements can be arranged on one of the front sides of the filter element on approximately opposing sides of the element axis. This enables uniform support of the filter element to be provided on opposing sides of the element axis.

Advantageously, the support elements can each be arranged in circumferential edge regions of the front side. In this way, the lever ratios can be improved through the corresponding distance to the element axis. Vibrations and mechanical loads can thus be introduced more uniformly into the filter element. The overall mechanical load on the filter element can thus be reduced.

In another advantageous embodiment, several support sections can be arranged on the filter housing. The support sections can advantageously be associated with corresponding support elements on the filter element.

Advantageously, two support sections can be arranged on approximately opposing sides of a housing axis that coincides with the element axis when the filter element is installed. It is also possible for more than two support sections for more than two support elements to be arranged in a uniformly or non-uniformly distributed manner.

In another advantageous embodiment, the at least one support element and the at least one support section can be arranged on a raw-air side of the filter element. In another embodiment, support element and support section can be arranged on a clean-air side.

Advantageously, a gap can be embodied between the filter element in the region of the front side with the at least one support element and an inner wall of the filter housing surrounding the filter element radially on the outside. Air can pass through the gap into the space surrounding the filter medium radially on the outside or exit therefrom. An airflow can thus flow axially to the element axis from an inlet space section of the filter housing to the inflow side of the filter medium. Depending on the direction of flow, the inflow side of the filter medium can be located in the element interior space or on the radially outside circumferential side of the filter element. Accordingly, the airflow can flow axially to the element axis from the outflow side of the filter medium into a corresponding outlet space section of the filter housing. By virtue of the axial airflow, an improved pack size of the filter housing can be achieved, thus reducing the space requirement. Furthermore, in the case of an axial airflow toward the inflow side and/or away from the outflow side, the pressure difference between inflow side and outflow side can be reduced. In particular, a lesser pressure difference can thus be achieved than with a comparable air filter in which the airflow is fed tangentially to the inflow side of the filter element or discharged tangentially from the outflow side.

In another advantageous embodiment, the at least one support element can be arranged or formed on an end body, particularly an end plate, of the filter element. The support element can be integrated into the end body or embodied separately and connected thereto.

Advantageously, the end body, particularly the end plate, can face with the at least one support element toward an inlet space section of the filter housing for air to be cleaned. The inlet space section can advantageously be connected to the at least one inlet. In this way, the at least one support element can be located on the raw-air side of the filter medium.

The filter medium can be stabilized with the at least one end body. Furthermore, the filter medium can be sealed off on the front side with the at least one end body.

The at least one end body can advantageously be made of plastic. It can advantageously be tightly connected to the front side of the filter medium by adhesion, welding, or in another manner. The material of which the end body is made can advantageously also be foamed onto or into the front side of the filter medium.

The at least one support element can advantageously be firmly connected to the at least one end body. The at least one support element can be firmly connected, particularly adhered, welded, foamed on, or connected in another manner, as a separate component to the end body. The at least one support element can also be connected mechanically, particularly by means of a locking connection, a snap-on connection, or in another manner, to the end body. The at least one support element can be detachably or non-detachably connected to the end body.

In another advantageous embodiment, a seal can be arranged between the filter element and the filter housing on the front side of the filter medium opposing the at least one support element. With the seal, the filter element can be sealed off in the axial and/or radial direction against the filter housing.

Moreover, the seal can have a support function. Advantageously, the filter medium can be supported against the filter housing by means of the seal in the axial and/or radial direction. The seal can act as a counterbearing for the at least one support element in the axial direction. The filter element can thus be braced between the seal and the at least one support element.

Advantageously, the seal can be made of an elastic material, particularly polyurethane, particularly a polyurethane foam.

The seal can advantageously cooperate with a corresponding housing-side sealing surface. The housing-side sealing surface can advantageously be arranged in a housing pot of the filter housing.

In another advantageous embodiment, an inlet-side inlet space section, an element space section in which the filter element is arranged, and an outlet-side outlet space section of the filter housing can be arranged successively in linear fashion along the flow path of the air through the air filter. In this way, axial inflow of the air to the inflow side of the filter medium can easily be achieved. Furthermore, axial outflow of the filtered air from the clear-air side of the filter element can thus be achieved. Any pressure differences between the clean-air side and the raw-air side can thus be reduced. Advantageously, a main the direction of flow of the air from the inlet space section through the element space section into the outlet space section can be substantially axial to the element axis.

In another advantageous embodiment of the air filter, the at least one support section has at least one continuous opening that is arranged such that a section of the filter element is visible from outside of the filter housing through the die opening. In particular, a section of the support element and/or of the front side or of an end body of the filter element is visible through the opening. The opening is a bore, for example. It can be seen through the opening whether a filter element is mounted in the filter housing, whereby the opening acts as an installation control. To avoid air exchange with the interior space via the opening, the support section on the housing and the support element on the filter element are preferably embodied such that the opening is sealed off. For example, a seal occurs over the lateral support surface and lateral counter support surface. The opening is preferably aligned in the axial direction of the housing.

The technical object is further achieved in the filter element in that the filter element has at least one support element on an outer side facing away from the element interior space on at least one front side that is axial in relation to the element axis that comprises a lateral support surface that is cylindrical at least in sections or has a changing cross section in the direction of a main axis of the lateral support surface and whose main axis runs parallel or coaxial to the element axis and with which the at least one support element can be supported at least transverse to the element axis against at least one corresponding support section on the side of a filter housing of the air filter into which the filter element can be installed.

The advantages and features described above in connection with the air filter according to the invention and its advantageous embodiments apply accordingly to the filter element according to the invention and its advantageous embodiments. Especially advantageous embodiments of the filter element are indicated in the claims that are dependent on the element claim.

Advantageously, the support element is embodied such that it is suitable for axially supporting the filter element in a filter housing. Preferably, the support element projects in the axial direction at least 15 mm from the axial front side of the filter element. The filter element can be a hollow element, so that the filter medium surrounds an element inner space in relation to the element axis. In such a filter element, the through-flow occurs radially, preferably from the outside inward. Alternatively, the filter medium can also consist of alternatingly closed channels, the filter medium being wound or stacked such that a compact filter element is formed. Such a filter element is flowed through axially.

In one embodiment, the lateral support surface is closed in the circumferential direction. In an alternative embodiment, the lateral support surface consists of several, at least two, mutually separated subsections. For example, slits are introduced into a circumferentially closed lateral support surface, thus resulting in the separated subsections. However, the individual subsections can also be embodied individually on the front side of the filter element.

According to an advantageous embodiment of the filter element, at least two support nubs are arranged at least on a periphery of the axial front side having the support element by means of which the filter element can be supported transverse to the element axis in the filter housing. Preferably, the support nubs project in the direction of the element axis and in the direction transverse to the element axis beyond the axial front side of the filter element. The support nubs are advantageously arranged so as to oppose one another. For example, the support nubs are formed against an end plate of the filter element. The support nubs are preferably made of PUR or another sufficiently stiff and nevertheless flexible material.

In an advantageous embodiment, the filter element has a cross section that deviates from a circular shape, particularly an oval or flatly oval cross section. The filter element can be cylindrical. However, a conical shape is also possible, in which case the cross section tapers in the direction of the axial front side having the support element. Particularly in the case of a hollow element through which flow passes radially, the conical shape enables improved inflow at the filter surface.

The technical object is further achieved in the filter housing according to the invention in that at least one support section is arranged on the side of the filter housing that comprises a lateral counter support surface whose main axis runs parallel or coaxial to a housing axis which, when the filter element is installed, is axial to the element axis, that is embodied so as to be cylindrical at least in sections or with a changing cross section in the direction of the main axis, and against which a corresponding support element located on an outer side facing away from the element interior space on at least one front side of the filter element that is axial in relation to the element axis can be supported at least transverse to the housing axis.

The advantages and features described above in connection with the air filter according to the invention and the filter element according to the invention and their advantageous embodiments apply accordingly to the filter housing according to the invention and its advantageous embodiments.

BRIEF DESCRIPTION OF THE DRAWINGS

Additional advantages, features and details of the invention follow from the following description, in which exemplary embodiments of the invention are described in further detail with reference to the drawing. A person skilled in the art will expediently view the features disclosed in combination in the drawing, the description and the claims individually as well and group them together into other sensible combinations. List of schematic FIGS.

FIG. 1 shows a longitudinal-side section of an air filter of a combustion engine according to a first exemplary embodiment with an exchangeable flatly oval round filter element;

In the figures, same components are provided with the same reference symbols.

DESCRIPTION OF THE INVENTION

Figure 3:
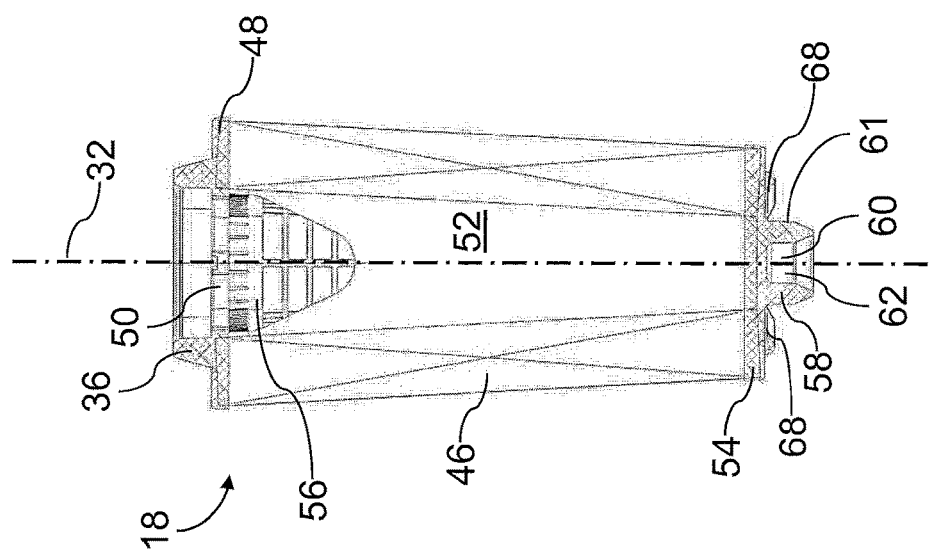
FIG. 3 shows a transverse-side longitudinal section of the round filter element of FIG. 2 along sectional line III-III shown there.
Figure 2:
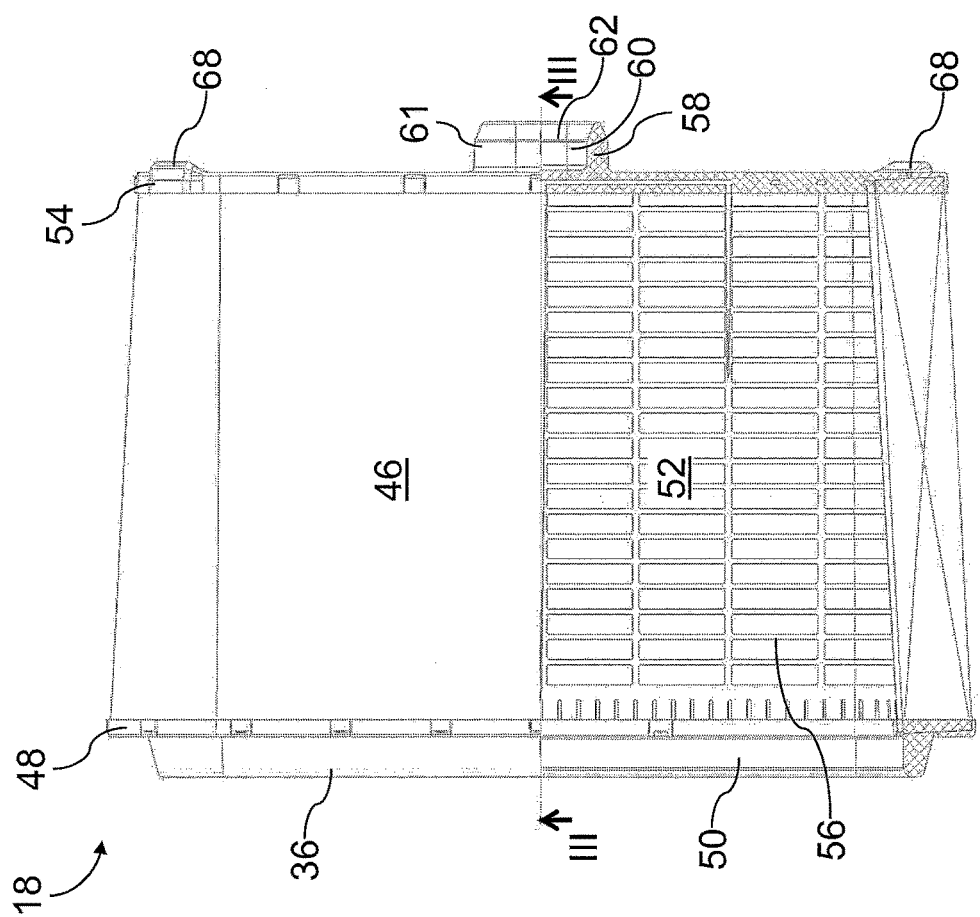
FIG. 2 shows a longitudinal-side partial section of the round filter element of FIG. 1.
Figure 5:
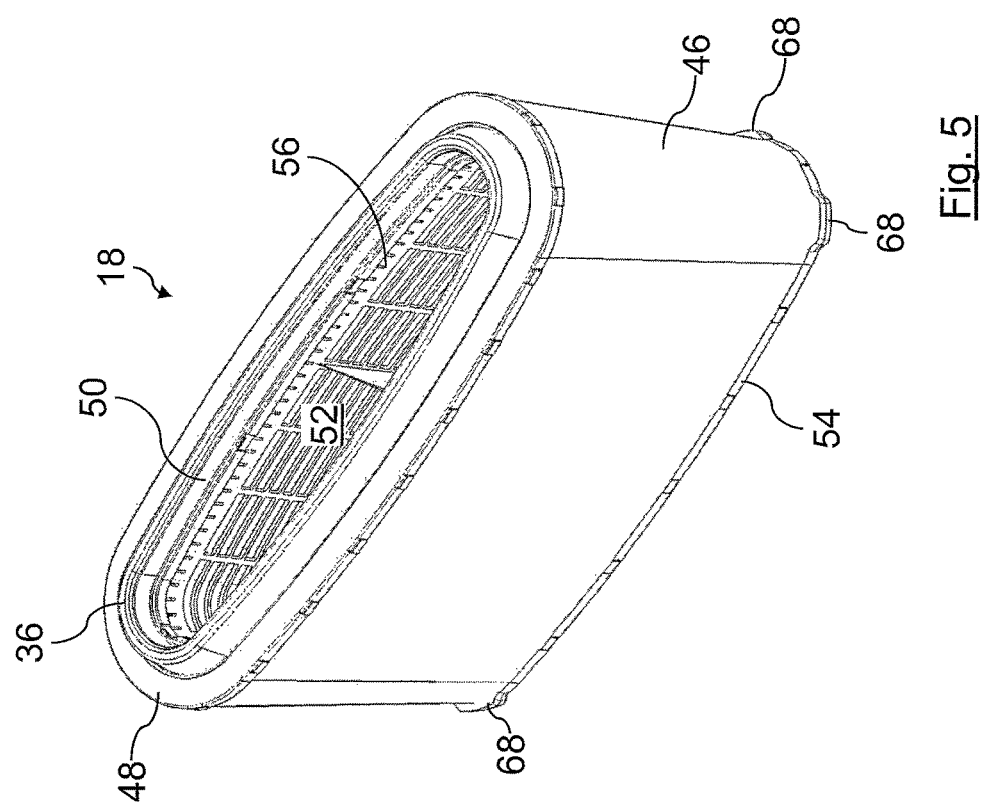
FIG. 5 shows an isometric representation of the round filter element of FIGS. 1 to 4 with a view toward an outlet-side end plate.
Figure 4:
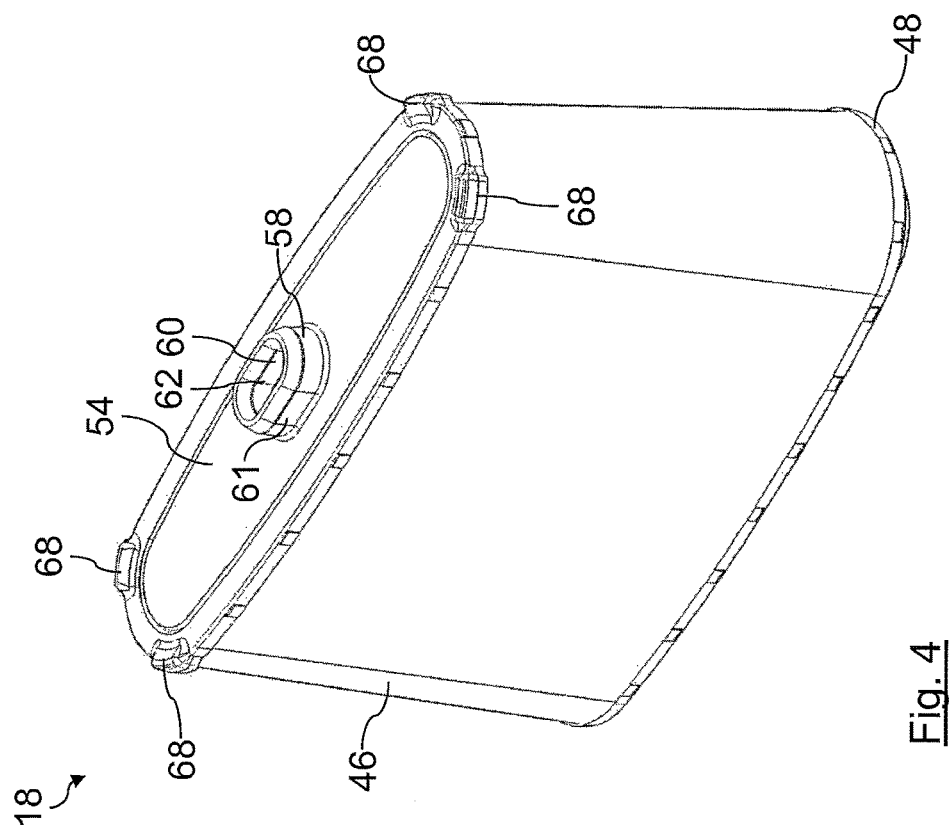
FIG. 4 shows an isometric representation of the round filter element of FIGS. 1 to 3 with a view toward an inlet-side end plate with a support element.

FIG. 1 shows an air filter 10 of an air intake system of a combustion engine of a commercial vehicle according to a first exemplary embodiment in a longitudinal-side section. The air filter 10 is arranged in an air intake system of the combustion engine. It is used to clean combustion air that is fed to the combustion engine for combustion.

The air filter 10 comprises an openable filter housing 12. The filter housing 12 is flatly oval. In comparison to an oval filter housing, the filter housing 12 is flattened with an approximately elliptical cross section in the direction of its short transverse axis. FIG. 1 shows a section along a long transverse axis of the filter housing 12. The filter housing 12 has a housing pot 14, to the left in FIG. 1, and a housing lid 20, to the right in FIG. 1. The housing pot 14 has an installation opening 16, to the right in FIG. 1, for installing a filter element 18. The installation opening 16 is sealed with the housing lid 20.

The housing pot 14 has an outlet 22 for the filtered air that leads to an outlet space section 24 of the housing pot 14. The outlet 22 is connected to the combustion engine outside of the filter housing 12 via air lines (not shown).

The housing lid 20 has an inlet 26 for air to be filtered that leads into an inlet space section 28 of the housing lid 20 and is connected to the surroundings outside of the filter housing 12.

The filter element 18 is arranged in an element space section 30 of the housing pot 14 such that it separates the inlet 26 from the outlet 22. The element space section 30 is arranged in linear fashion between the inlet space section 28 and the outlet space section 24.

The inlet space section 28, the element space section 30 and the outlet space section 24 are arranged successively in an axial manner in relation to an axis 32. The axis 32 coincides with a housing axis of the filter housing 12. In the present exemplary embodiment, the axis 32 also coincides with an installation direction in which the filter element 18 is inserted into the housing pot 14 and can be removed therefrom. In the present exemplary embodiment, the axis 32 further coincides with a mounting direction in which the housing lid 20 is mounted on the housing lid 14. The installation opening 16 surrounds the axis 32 circumferentially.

When reference is made below to "axial," "radial," "circumferential" or "coaxial," this refers to the axis 32 if not otherwise indicated.

Axially between the element space section 30 and the outlet space section 24, the housing pot 14 has a circumferentially closed sealing surface 34. The sealing surface 34 extends in the radial direction. The sealing surface 34 faces toward the housing lid 20. A seal 36 of the filter element 18 rests tightly against the sealing surface 34 in a circumferentially closed manner.

The radially inside cross section of the element space section 30 is larger than a radially outside cross section of the sealing surface 34.

An inflow annular space 38 is embodied between a radially outside circumferential side of the filter element 18 and the radially inside circumferential side of the element space section 30. The inflow annular space 38 is separated from the outlet space section 24 by means of the seal 36.

On the side facing toward the housing lid 20, the inflow annular space 38 is connected to the inlet space section 28 via a circumferential gap 40. The inlet space section 28 and the inflow ring section 38 are located on the raw-air side of the filter element 18.

The inlet space section 28 projects over the filter element 18 and the gap 40 in the radial direction and overlaps with the gap 40. The inlet space section 28 has its maximum extension in a region in which the inlet 26 is arranged. The maximum axial extension of the inlet space section 28 is approximately as large as the axial extension of the element space section 30.

The outlet space section 24 has its maximum axial extension in a region in which the outlet 22 is arranged. The maximum axial extension of the outlet space section 24 is somewhat smaller than the maximum axial extension of the inlet space section 28 and the axial extension of the element space section 30.

A support column 42 is arranged on the housing lid 20. It is integrally connected to the housing lid 20. The support column 42 is approximately coaxial to the axis 32, i.e., coaxial to the housing axis. It is centrally arranged in relation to the housing axis. The support column 42 extends in the inlet space section 28 from an inner side of the housing lid 20 facing toward the filter element 18 to the inlet-side front side of the filter element 18. The support column 42 is located on the raw-air side of the filter medium 46.

A coaxial counter support groove running circumferentially to a main axis of the support column 42, i.e., to the axis 32 and to the housing axis, is arranged on the free front side of the support column 42 facing toward the filter element 18. The counter support groove is a hollow space in the support column 42 that is open toward the free front side of the support column 42. A radially inside circumferential wall of the counter support groove forms a radially inside lateral counter support surface 44. The radially inside lateral counter support surface 44 is aligned radially outward in relation to the main axis of the support column 42. A radially outside circumferential wall of the counter support groove forms a radially outside lateral counter support surface 45. The radially outside lateral counter support surface 45 is aligned radially inward in relation to the main axis of the support column 42. The lateral counter support surfaces 44 and 45 are coaxial to the axis 32. They each have a cylindrical profile. Moreover, they each have an oval cross section. The long transverse axis of the respective oval lies in the drawing plane of FIG. 1, and the short transverse axis stands perpendicularly on the drawing plane.

The filter element 18 is shown in different detailed views in FIGS. 2 to 5. The filter element 18 is a conical flatly oval round filter element. The filter element 18 is coaxial to an element axis. In the depicted exemplary embodiment, when the filter element 18 is installed, the element axis coincides with the housing axis, i.e., the axis 32. The filter element 18 has a flatly oval cross section. The long transverse axis of the oval lies in the drawing plane of FIG. 1, and the short transverse axis stands perpendicularly on the drawing plane. In the direction of the short transverse axis, the filter element 18 is additionally flattened, hence the term "flatly oval." In contrast, "oval" refers to an approximately elliptical cross section. A radially outside circumferential side and a radially inside circumferential side of the filter element 18 each have a conical profile. The outer cross section and the inner cross section of the filter element 18 taper from its outlet-side front side facing toward the outlet space section 24 toward the inlet-side front side.

The filter element 18 comprises a circumferentially closed filter medium 46 folded in a zigzag shape in relation to an element axis. The filter medium 46 is a filter paper that is suitable for filtering air. However, it can also be a different kind of filter medium for filtering, such as filter fleece. The filter medium 46 can be single- or multilayered.

The filter medium 46 is connected at its outlet-side front side to a coaxial outlet-side end plate 48. The outlet-side end plate 48 is made of an elastomer. It is tightly adhered to the front side of the filter medium 46. It can also be connected in another manner to the filter medium 46. For example, it can also be welded or foamed on or against it. The radially outside circumferential side of the outlet-side end plate 48 lies with minimal backlash against the radially inside circumferential side of the housing pot 14.

The outlet-side end plate 48 has a central outflow opening 50. The outflow opening 50 extends over the entire radially inside cross section of the filter medium 46. An element interior space 52 of the filter element 18, which is surrounded by the filter medium 46, is connected via the outflow opening 50 to the outlet space section 24.

The seal 36 is arranged on the outer side of the outlet-side end plate 48 axially opposing the filter medium 46. The seal 36 is made of elastic polyurethane foam. It is foamed against the outlet-side end plate 48. Instead of polyurethane foam, the seal 36 can be made of a different, preferably elastic, material, for example a plastic. Instead of being foamed, it can also be connected in another manner to the outlet-side end plate 48. The seal 36 is coaxial to the element axis and surrounds the outflow opening 50 circumferentially. It extends in the axial direction. It is supported in the axial direction against the sealing surface 34 of the housing pot 14.

The filter medium 46 is tightly connected on the inlet-side front side to an inlet-side end plate 54. The inlet-side end plate 54 seals the element interior space 52 toward the inlet space section 28. In a similar manner as the outlet-side end plate 48, the inlet-side end plate 54 is tightly connected to the filter medium 46. It can also be connected in another manner to the filter medium 46.

A coaxial support pipe 56 extends in the element interior space 52 between the inlet-side end plate 54 and the outlet-side end plate 48. The support pipe 56 is made of plastic. It has a lattice-like structure. Its circumferential side is air-permeable. The support pipe 56 has a conical flatly oval shape corresponding to the filter medium 46. The radially inside circumferential side of the filter medium 46 is supported on the radially outside circumferential side of the support pipe 56. It can be seen in FIG. 3 that the support pipe 56 is equipped with a stiffening rib that extents along the short transverse axis between the long sides of the flatly oval filter element 18. The stiffening rib does not extent over the entire element inner space 52; rather, it has a recess in the direction of the opening of the filter element 18, so that air exchange can take place between the two chambers of the filter element 18 formed by the stiffening rib.

A support element 58 is arranged on the axial outer side of the inlet-side end plate 54 facing away from the element interior space 52. The support element 58 is located on the raw-air side of the filter medium 46. The support element 58 is firmly connected to the inlet-side end plate 54. The support element 58 is made of an elastic material. For example, it can be made of a polyurethane foam. The support element 58 is foamed against the inlet-side end plate 54. It can also be connected in another manner to the inlet-side end plate 54. A support element can also be used that is integrally connected to the inlet-side end plate 54.

The support element 58 is sleeve-like. It has the shape of a hollow cylinder whose main axis extends in the depicted exemplary embodiment coaxially to the element axis. The support element 58 has an approximately oval cross section. Its short transverse axis lies in the drawing plane in FIG. 1, and its long transverse axis stands perpendicularly on the drawing plane. The orientation of the support element 58 in relation to the axis 32, i.e., the housing axis, thus corresponds to the orientation of the lateral counter support surfaces 44 and 45.

The radially inside circumferential side of the support element 58 forms a radially inside lateral support surface 60. The radially inside lateral support surface 60 surrounds a hollow space 62 of the support element 58. In the depicted exemplary embodiment, a main axis of the radially inside lateral support surface 60 is coaxial to the main axis of the support element 58 and thus also to the element axis. The radially inside lateral support surface 60 is aligned radially inward in relation to its main axis. The inner cross section of the radially inside lateral support surface 60 corresponds to the outer cross section of the radially inside lateral counter support surface 44.

The radially outside circumferential side of the support element 58 forms a radially outside lateral support surface 61. The main axis of the radially outside lateral support surface 61 is coaxial to the main axis of the radially inside lateral support surface 60. The radially outside lateral support surface 61 is aligned radially outward in relation to its main axis. The outer cross section of the radially outside lateral support surface 61 corresponds to the inner cross section of the radially outside lateral counter support surface 45.

When the filter element 18 is properly mounted, the section of the support column 42 surrounded by the counter support groove and bearing the radially inside lateral counter support surface 44 is inserted in the hollow space 62 of the support element 58. The hollow cylindrical, sleeve-like support element 58 is inserted into the counter support groove of the support column 42. The radially inside lateral support surface 60 rests against the radially inside lateral counter support surface 44. The radially outside lateral support surface 61 rests against the radially outside lateral counter support surface 45.

The radially inside lateral support surface 60 and the radially outside lateral support surface 61 of the support element 58 are cylindrical with an oval cross section on the side facing toward the end plate 54. On its free side facing away from the end plate 54, the radially inside lateral support surface 60 has a conical section whose inner cross section widens outward toward the free end of the support element 58. The outer cross section of the radially outside lateral support surface 61 decreases in the conical section toward the free end of the support element 58. Overall, the wall thickness of the support element 58 decreases in the conical section toward the free edge. The insertion of the support element 58 into the counter support groove of the support column 42 can thus be simplified.

The filter element 18 is supported with the support element 58 over the support column 42 against the filter housing 12. The support occurs radially, i.e., transverse to the element axis and to the housing axis, and axially. Through the cooperation of the support element 58 with the support column 42, the filter element 18 is held and positioned radially and axially on the inlet side, i.e., on the raw-air side. The filter element 18 can thus be held in the filter housing 12 on the side facing toward the inlet space section 28 without the gap 40 being covered by the required holding components. Furthermore, two support nubs 68 are respectively arranged on the radially outside edges of the inlet-side end plate 54 in the region of the short transverse sides. The support nubs 68 each project over the inlet-side end plate 54 both in the radial direction and in the axial direction. The support nubs 68 are each supported on corresponding support points (not shown in the figures) on the inner side of the housing lid 20 in the radial direction.

During operation of the air filter 10, the air to be filtered flows through the inlet 26, indicated by an arrow 64, into the inlet space section 28. From there, the air passes substantially in the axial direction through the gap 40 into the inflow annular space 38 on the inflow side of the filter medium 46. The air flows through the filter medium 46 from radially on the outside to radially on inside and is cleaned. The cleaned air flows through the circumferential side of the support pipe 56 and goes into the element interior space 52. The cleaned air leaves the element interior space 52 substantially in the axial direction and goes into the outlet space section 24. From there, the filtered air leaves the filter housing 12 through the outlet 22, indicated by an arrow 66.

For maintenance purposes, for example in order to clean or exchange the filter element 18, the filter housing 12 can be opened. For this purpose, the housing lid 20 is removed from the housing lid 14 in the axial direction. The support element 58 is automatically pulled out of the counter support groove at the end of the support column 42. The filter element 18 is pulled in the axial direction out of the element space section 30 of the housing pot 14. It can be replaced by a new filter element 18 or reinstalled after cleaning.

For the purpose of installation, the filter element 18 is inserted with the outlet-side end plate 48 first in the axial direction into the housing pot 14 until the seal 36 rests against the sealing surface 34. The housing lid 20 is then placed with its open side first in the axial direction onto the installation opening 16 of the housing pot 14. The support element 58 is inserted into the counter support groove of the support column 42. The section with the radially inside lateral counter support surface 44 at the end of the support column 42 engages in the hollow space 62 of the support element 58.

Figure 6:
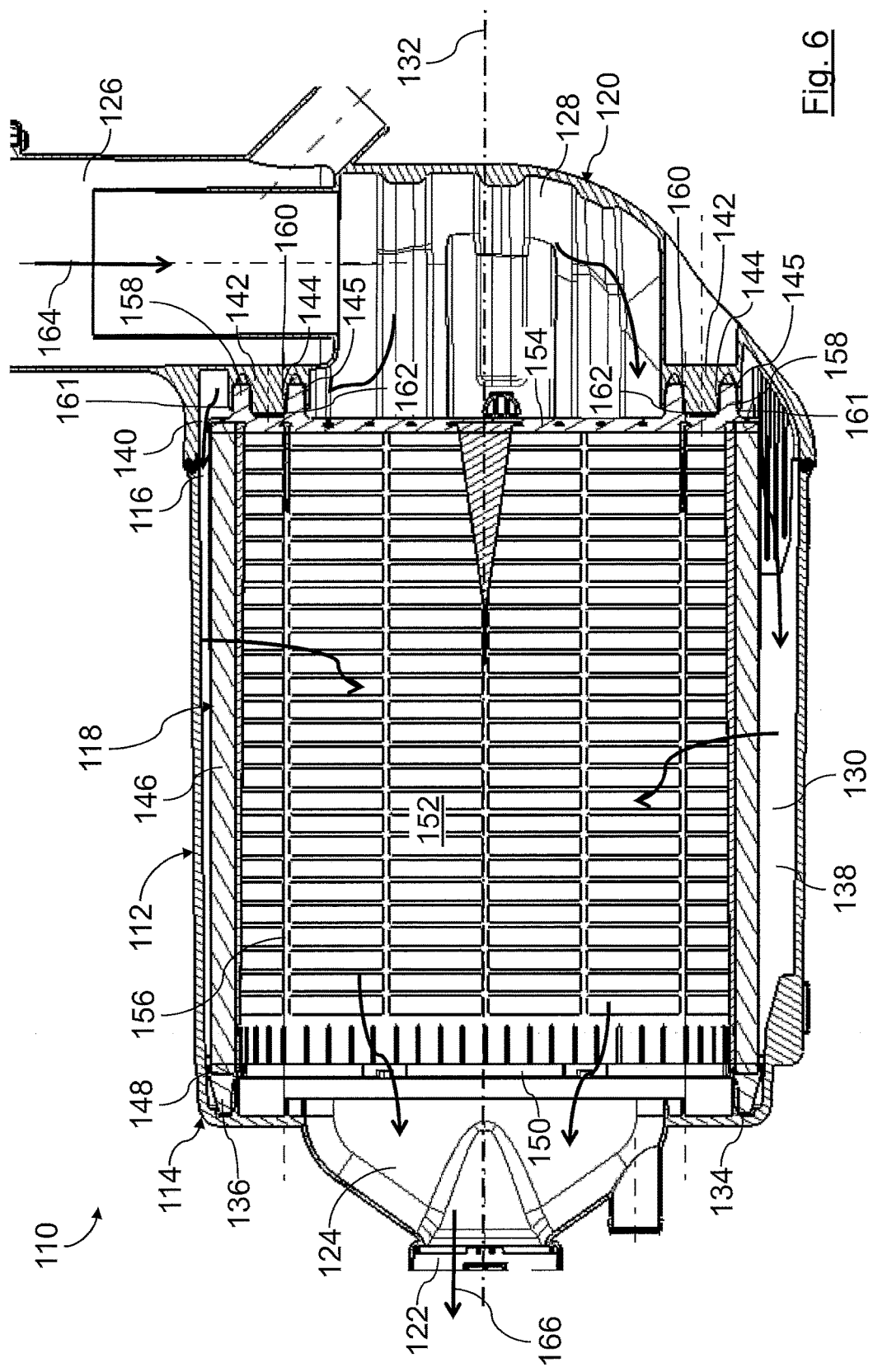
FIG. 6 shows a longitudinal-side section of an air filter of a combustion engine according to a second exemplary embodiment with an exchangeable flatly oval round filter element.
Figure 8:
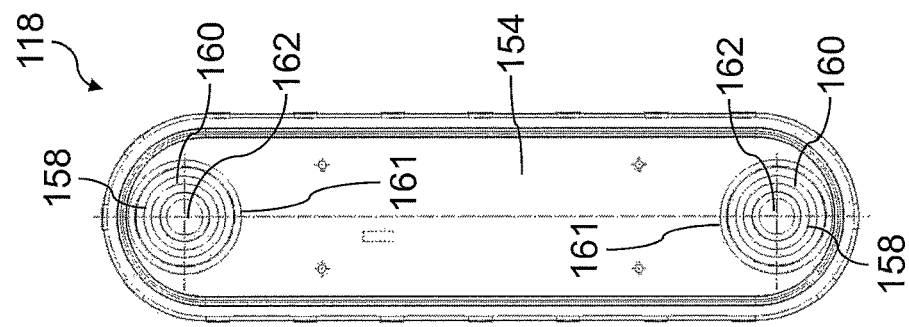
FIG. 8 shows a top view of the round filter element of FIGS. 6 and 7 onto an inlet-side end plate with two support elements.
Figure 7:
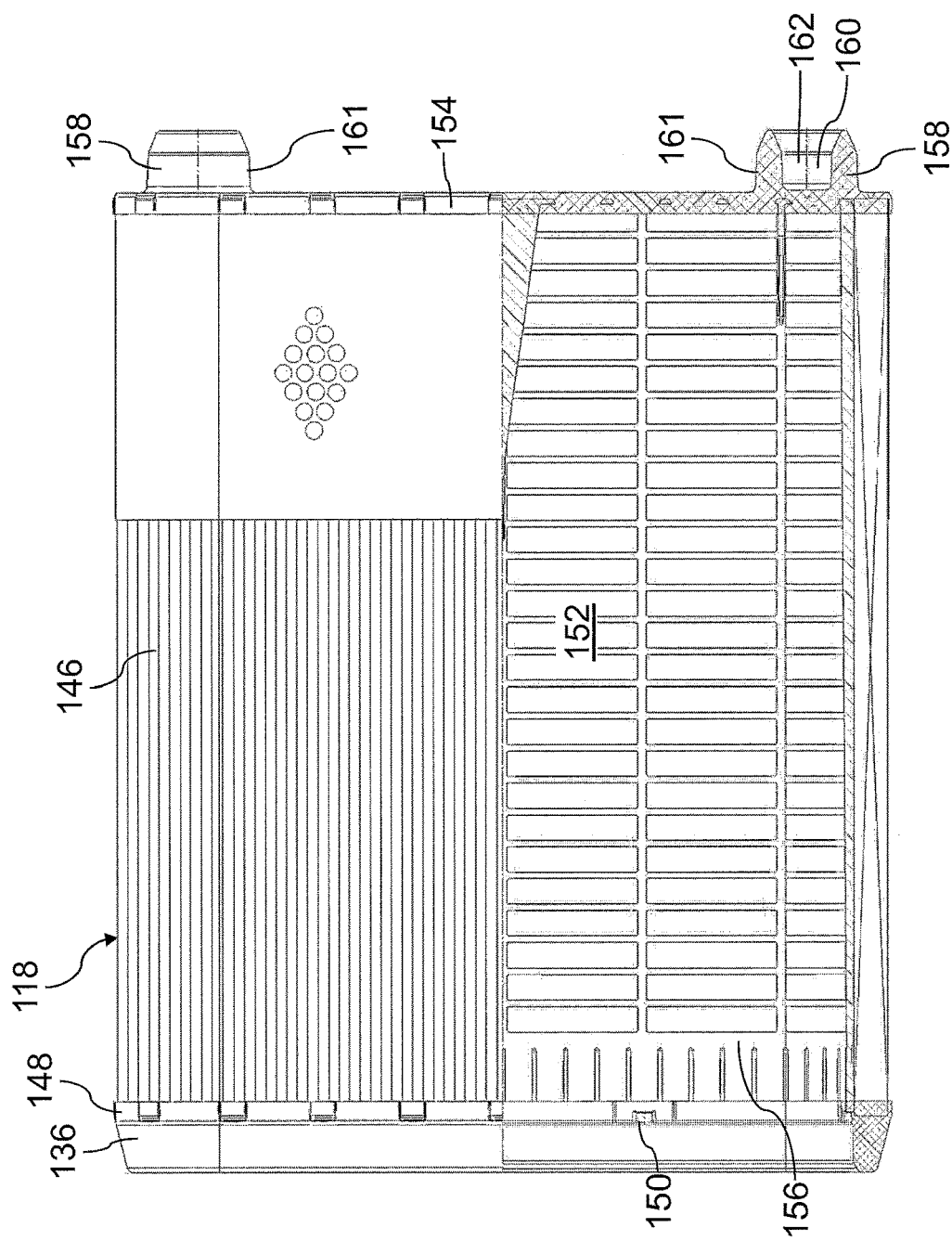
FIG. 7 shows a longitudinal-side partial section of the round filter element of FIG. 6.
Figure 10:
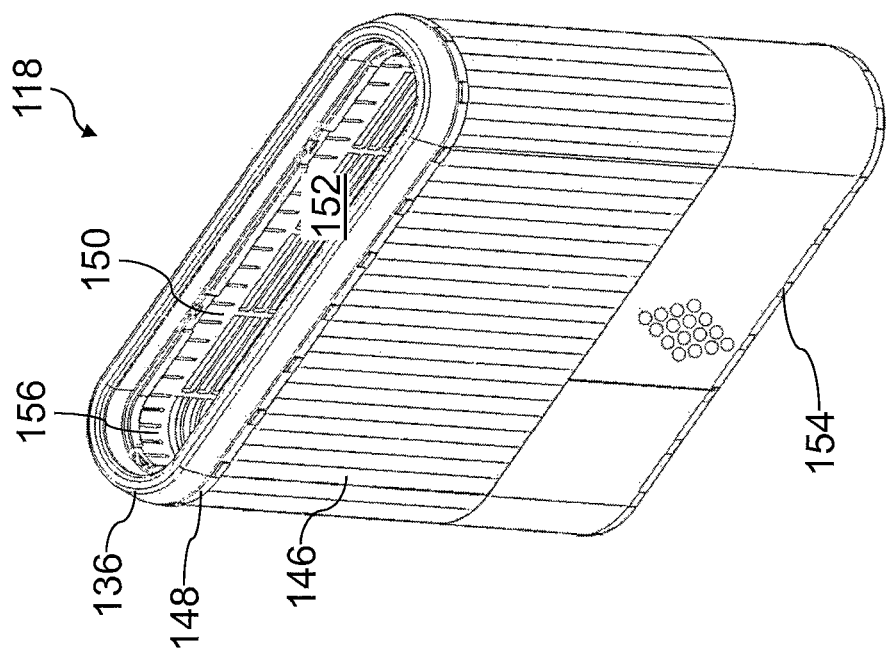
FIG. 10 shows an isometric representation of the round filter element of FIGS. 6 to 9 with a view toward an outlet-side end plate.
Figure 9:
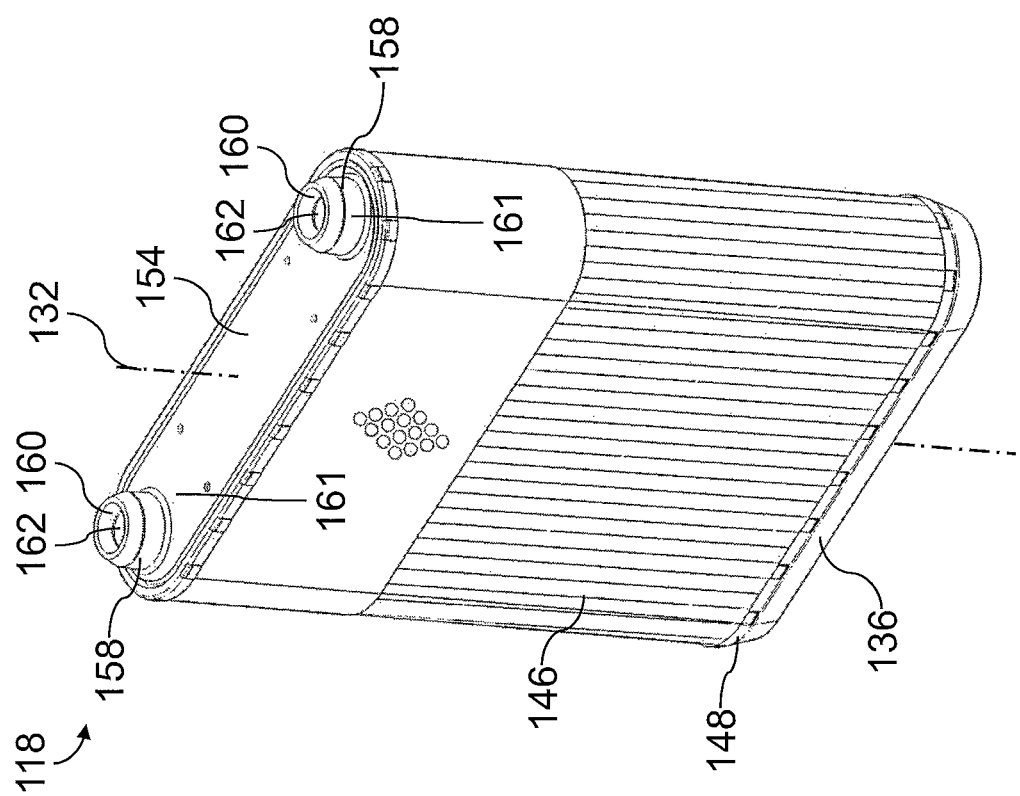
FIG. 9 shows an isometric representation of the round filter element of FIGS. 6 to 8 with view toward the inlet-side end plate.

FIG. 6 shows a second exemplary embodiment of an air filter 110. Those elements which are similar to those of the first exemplary embodiment of FIGS. 1 to 5 are provided with the same reference symbols plus 100. The second exemplary embodiment differs from the first exemplary embodiment in that, in the second exemplary embodiment, the filter element 118 has two support elements 158 on its inlet-side end plate 154. The filter element 118 is shown in FIGS. 7 to 10 in detail in different perspectives.

The support elements 158 each have the shape of circular cylindrical sleeves. They are each located in the region of a transverse-side side edge of the inlet-side end plate 154. The hollow spaces 162 of the support elements 158 are each surrounded by a radially inside lateral support surface 160 in relation to a respective main axis of the support element 158. The radially inside lateral support surfaces 160 are each aligned radially inward in relation to the main axis. In a conical section on the free front side, the hollow spaces 162 each widen toward the free end of the support elements 158. The radially outside circumferential sides of the support elements 158 each form radially outside lateral support surfaces 161.

Moreover, unlike the first exemplary embodiment, two support columns 142 associated with the support elements 158 are provided in the second exemplary embodiment. The support columns 142 each extend with their main axis parallel to the axis 132, i.e., parallel to the housing axis of the filter housing 112.

Analogously to the first exemplary embodiment, the sleeve-like support elements 158 are each in a counter support groove on the free front sides of the support columns 142. The sections at the free ends of the support columns 142 bearing the radially inside lateral counter support surfaces 144 are in the respective hollow spaces 162 of the support elements 158. The radially outside lateral counter support surfaces 145 of the support columns 142 each surround the radially outside lateral support surfaces 161 of the support elements 158. The support elements 158 are supported in relation to their main axes in the radial direction. The support elements 158 are supported in the axial direction in relation to the axis 132, that is, the element axis and the housing axis in the depicted exemplary embodiment. Depending on the circumferential side of the support element 158 each support element 158 is supported in the radial or tangential direction or in another direction transverse to the axis 132. Rotation of the filter element 118 in the region of the inlet-side end plate 158 about the axis 132, i.e., the housing axis in the present case, can thus be prevented.

Unlike the first exemplary embodiment, the filter element 118 is cylindrical. It is a cylindrical flatly oval round filter element.

Moreover, in the second exemplary embodiment, the support nubs 68 of the first exemplary embodiment are omitted.

Figure 11:
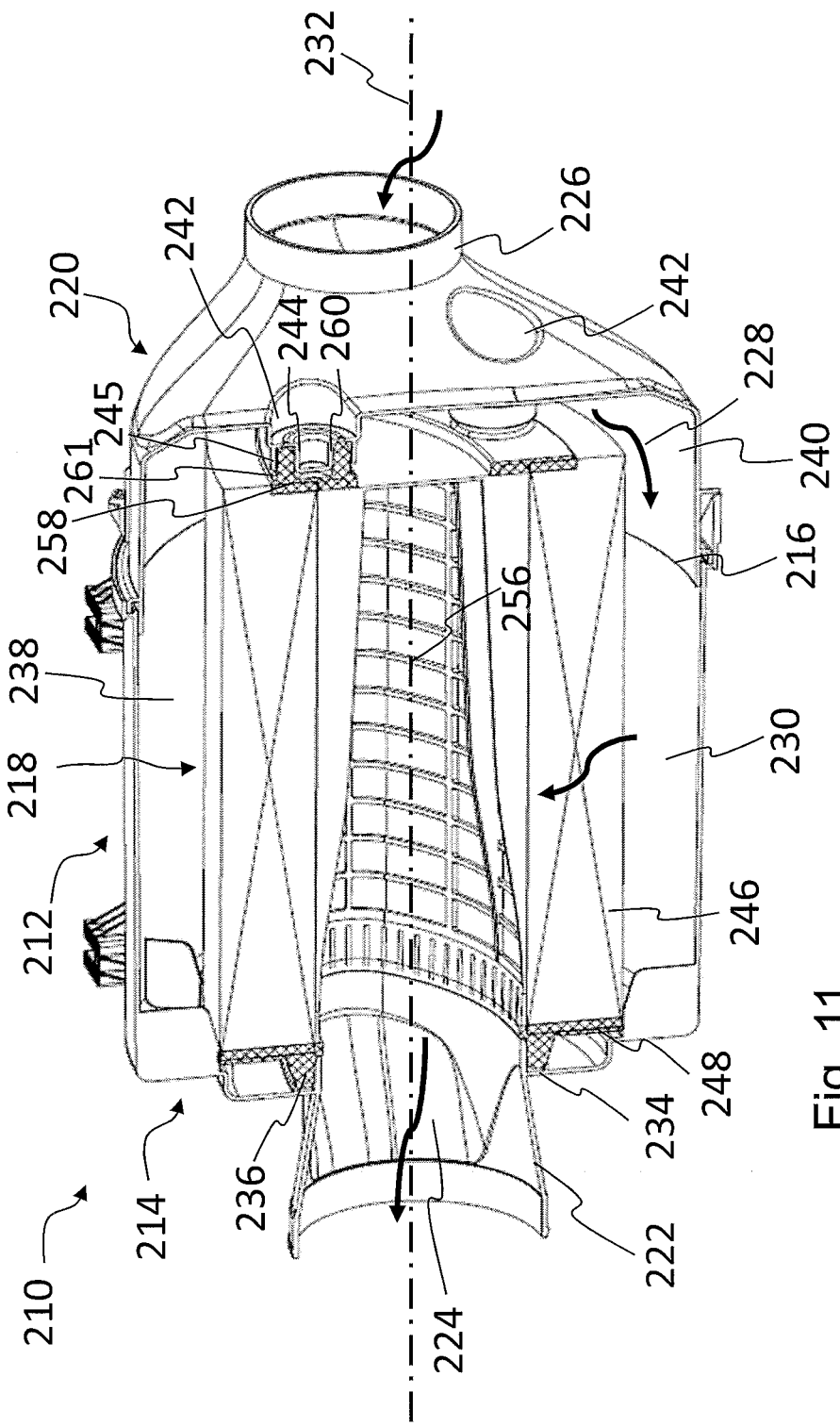
FIG. 11 shows an isometric representation of an air filter of a combustion engine according to a third exemplary embodiment cut on a transverse side with an exchangeable cylindrical filter element.
Figure 12:
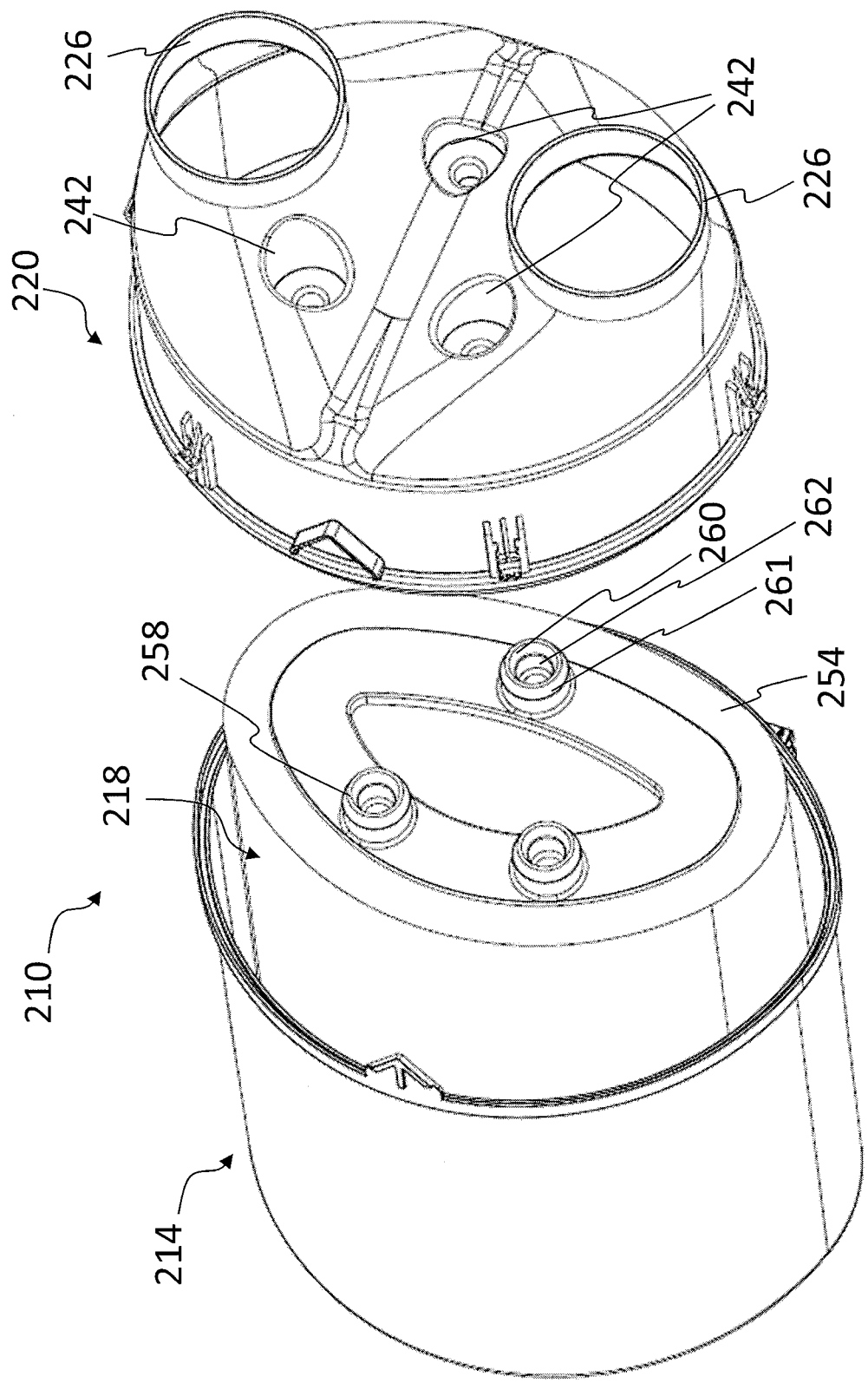
FIG. 12 shows a perspective representation of an air filter according to FIG. 11 with filter element inserted into the housing pot and lid removed.

FIGS. 11 and 12 show a third embodiment of an air filter 210. The elements corresponding to the elements of the first exemplary embodiment are provided with the same reference symbols plus 200. The air filter 210 can be mounted horizontally and flowed through from right to left as shown, or it can be mounted vertically and flowed through from top to bottom.

The housing lid 220 has two inlets 226 for air to be filtered and an opposing outlet 222. The two inlets 226 are arranged symmetrically in relation to the axis 232. Like in the other embodiments, the element space section 230 is arranged linearly between the inlet space section 228 and the outlet space section 224.

The filter element 218 is cylindrical and possesses an oval eccentric base surface that is mirror-symmetrical in relation to a transverse axis. Three support elements 258 are formed against the inlet-side end plate 254. The inlet-side end plate 258 is made in sections of elastic polyurethane and foamed against the filter medium. In the center, the end plate is formed by a plastic part that is part of the support pipe 256 of the filter element 218. The support elements 258 are integrally formed with the elastic section of the end plate 254.

The support elements 258 have a circular cylindrical cross section, and each defines a hollow space 262 that is surrounded by an inner lateral support surface 260 that is aligned radially inward in relation to a main axis of the support element 258.

Analogously to the second exemplary embodiment, the cylindrical section leads to a conical section. As a result, the hollow spaces 262 widen on the free front side toward the free end of the support elements 258. The radially outside circumferential sides of the support elements 258 each form radially outside lateral support surfaces 261.

For each of the three support elements 258, the housing 212 has a support column 242. The support columns 242 each extend with their main axis parallel to the axis 232 and thus parallel to the housing axis of the filter housing 212. Analogously to the previous exemplary embodiments, the support elements 258 are each inserted into a counter support groove on the free front sides of the support columns 242. The radially inside lateral support surfaces 260 of the support elements 258 each rest against a corresponding lateral counter support surface 244 of the support columns 242 and the radially outside lateral support surfaces 261 against corresponding lateral counter support surfaces 245. The support elements 258 are supported in relation to their main axis in the radial direction. The support elements 258 are supported at least transversely, e.g., in the radial or tangential direction in relation to the axis 232, which coincides with a housing axis and an element axis. Moreover, axial support occurs in the direction of the axis 232 via the support elements 258.

By virtue of the three support elements 258, the filter element 218 is supported stably in a direction transverse to and along the axis 232 in the housing 212. The arrangement of the support elements 258 and support columns 242 enables optimal inflow into the filter element 218, since the cross section of the annular gap 240, which connects the inlet space section 228 to the element space section 230, is not reduced as a result.

What is claimed is:

1. An air filter, comprising:
   an openable filter housing, including:
      at least one inlet for air to be cleaned; and
      at least one outlet for cleaned air;
   a filter element exchangeably arranged with the filter housing; the filter element including:
      a filter medium radially surrounding and defining an interior space within the filter element;
      at least one support element secured to the filter element, the at least one support element facing away from the filter medium on at least one axial front side of the filter element in relation to an element axis extending through the interior space;
      wherein the at least one support element has at least one lateral support surface having at least one cylindrical section and/or at least one section with a cross section that changes in the direction of the element axis, whose main axis runs axially or parallel to the element axis and with which the support element is supported at least transversely to the element axis against at least one corresponding support section arranged on a side of the filter housing;
      wherein the filter element has an oval or a flatly oval cross section, having:
         a long transverse axis arranged perpendicular to the element axis;
         a short traverse axis arranged perpendicular to long traverse axis and perpendicular to the element axis;
         wherein the long transverse axis extends through radially oppositely positioned short traverse sides of the at least one axial front side of the filter element;
         wherein the short transverse axis extends through radially oppositely positioned long traverse side sides of the at least one axial front side of the filter element;
      a plurality of support nubs arranged on a radially outer periphery of the at least one axial front side having the at least one support element such that the filter element can be supported transverse to the element axis against an interior of the filter housing;
      wherein the plurality of support nubs are arranged on the radially outer periphery in a position where the long traverse side joins to the short traverse side;
      wherein the plurality of support nubs project in a direction of the element axis and in a direction transverse to the element axis outwardly beyond the axial front side of the filter element.

2. The air filter as set forth in claim 1, wherein
the at least one support section has at least one lateral counter support surface having at least one cylindrical section and/or at least one section with a cross section that changes in the direction of a main axis of the lateral counter support surface, the main axis running axial or parallel to a housing axis which, when the filter element is installed, is coaxial to the element axis.

3. The air filter as set forth in claim 1, wherein
at least one of the at least one lateral support surface is aligned radially inward in relation to its main axis aligned radially inward and surrounds a hollow space of the at least one support element that is open on the corresponding free end of the at least one support element;
at least one of the lateral counter support surface is aligned radially outward in relation to its main axis; and
when the filter element is installed properly into the housing, the lateral counter support surface is inserted into a hollow space of the at least one support element.

4. The air filter as set forth in claim 1, wherein,
at least one support element is arranged centrally in relation to the element axis on one of the front sides of the filter element.

5. The air filter as set forth in claim 1, wherein
the at least one support element includes a hollow support element arranged centrally in relation to the element axis on one of the
at least one axial front sides of the filter element;
the hollow support element has an open interior extending along the element axis and opening at an axially outer end of the hollow support element, wherein the open interior opens into the interior space of the filter element at an axially inner end of the hollow support element;
the at least one corresponding support section includes a central support section arranged on an interior surface of the filter housing, the central support section arranged centrally in relation to a housing axis which, when the filter element is installed, coincides with the element axis;
wherein the central support section engages with the hollow support element when the filter element is installed.

6. The air filter as set forth in claim 1, wherein
a plurality of support elements are arranged on one of the front sides of the filter element.

7. The air filter as set forth in claim 1, wherein
a plurality of support sections are arranged on the filter housing.

8. The air filter as set forth in claim 1, wherein
the at least one support element and the at least one corresponding support section are arranged on a raw-air side of the filter element.

9. The air filter as set forth in claim 1, wherein
the at least one support element is arranged or formed on an end plate of the filter element.

10. The air filter as set forth in claim 1, wherein
a seal is arranged on a front side of the filter medium opposing the at least one support element between the filter element and the filter housing.

11. The air filter as set forth in claim 1, wherein
an inlet-side inlet space section;
an element space section in which the fitter element is arranged; and
an outlet-side outlet space section of the filter housing are arranged successively in linear fashion along a flow path of the air through the air filter.

12. The air filter as set forth in claim 1, wherein
the at least one corresponding support section has at least one continuous opening that is arranged such that a section of the filter element is visible from outside of the filter housing through the opening.

13. A filter element, comprising:
a filter medium radially surrounding and defining an interior space within the filter element;
wherein the filter element has an element axis extending centrally in the interior space;
at least one support element secured to the filter element, the at least one support element facing away from the filter medium on at least one axial front side of the filter element in relation to the element axis;
wherein the at least one support element has at least one lateral support surface whose main axis runs parallel or coaxial to the element axis, that is cylindrical at least in sections or has a changing cross section in the direction of a main axis of the lateral support surface, and with which the at least one support element is adapted to be supported at least transverse to the element axis against at least one corresponding support section on a side of a filter housing when the filter element is installed;
wherein the filter element has an oval or a flatly oval cross section, having:
a long transverse axis arranged perpendicular to the element axis;
a short traverse axis arranged perpendicular to long traverse axis and perpendicular to the element axis;
wherein the long transverse axis extends through radially oppositely positioned short traverse sides of the at least one axial front side of the filter element;
wherein the short transverse axis extends through radially oppositely positioned long traverse side sides of the at least one axial front side of the filter element;
a plurality of support nubs arranged on a radially outer periphery of the at least one axial front side having the at least one support element such that the filter element can be supported transverse to the element axis against an interior of the filter housing;
wherein the plurality of support nubs are arranged on the radially outer periphery in a position where the long traverse side joins to the short traverse side;
wherein the plurality of support nubs project in a direction of the element axis and in a direction transverse to the element axis outwardly beyond the axial front side of the filter element.

14. The filter element as set forth in claim 13, wherein
the filter medium surrounds the element inner space about the element axis.

15. The filter element as set forth in claim 13, wherein
the lateral support surface is closed in a circumferential direction.

16. The filter element as set forth in claim 13, wherein
the lateral support surface consists of several mutually separated subsections.

17. The filter element as set forth in claim 13, wherein
the support element is configured and adapted for axially supporting the filter element in the filter housing.

18. The filter element as set forth in claim 13, wherein
the support element projects in the axial direction at least 15 mm from the axial front side of the filter element.

19. The filter element as set forth in claim 13, wherein
the filter element is conical with a cross section tapering in a direction of the axial front side having the support element.

20. A filter housing of an air filter, comprising:
at least one inlet for air to be cleaned; and
at least one outlet for cleaned air;
a filter element according to claim 13 such that the filter element separates the at least one inlet from the at least one outlet;
at least one support section arranged on a side of the filter housing that includes a lateral counter support surface whose main axis runs parallel or coaxial to a housing axis which, when the filter element is installed, is axial to an element axis of the filter element;
wherein the lateral counter support surface is cylindrical at least in sections or with a changing cross section in the direction of the main axis, and against which a corresponding support element located on an outer side facing away from a filter element interior space on at least one front side of the filter element that is axial in relation to the element axis can be supported at least transverse to the housing axis.

\* \* \* \* \*